(12) United States Patent
Yamamoto et al.

(10) Patent No.: US 6,167,932 B1
(45) Date of Patent: Jan. 2, 2001

(54) PNEUMATIC TIRE FOR PASSENGER CARS HAVING SPECIFIED HARSHNESS FACTOR

(75) Inventors: Akio Yamamoto, Kakogawa; Mitsushige Idei, Kobe; Kenji Tagashira, Kobe; Fumikazu Yamashita, Kobe, all of (JP)

(73) Assignee: Sumitomo Rubber Industries, Ltd., Hyogo-ken (JP)

( * ) Notice: Under 35 U.S.C. 154(b), the term of this patent shall be extended for 0 days.

(21) Appl. No.: 09/185,749

(22) Filed: Nov. 4, 1998

(30) Foreign Application Priority Data

Nov. 4, 1997 (JP) .................................... 9-302018

(51) Int. Cl.$^7$ .............................. B60C 11/00; B60C 5/00
(52) U.S. Cl. ................. 152/209.14; 152/209.1; 152/450; 152/454; 156/110.1
(58) Field of Search ............................ 152/209.14, 454, 152/209.1, 450; 156/110.1

(56) References Cited

FOREIGN PATENT DOCUMENTS 4-218404 * 8/1992 (JP) ..................................... 152/454

* cited by examiner

Primary Examiner—Adrienne C. Johnstone
(74) Attorney, Agent, or Firm—Birch, Stewart, Kolasch & Birch, LLP

(57) ABSTRACT

A pneumatic tire for passenger cars which is improved in harshness noise without deteriorating the steering stability is disclosed, wherein a harshness factor HF is set in the range of from 3.2 to 3.5, the harshness factor HF is:

$$HF = -0.133 \times (R1/100) + 0.245 \times (R1/R2) - 0.183 \times (Kv/10) + 3.898$$

R1 is a radius of curvature (in mm) of a crown part of the tread profile, R2 is a radius of curvature (in mm) of shoulder parts of the tread profile, and Kv is the vertical spring constant in kN/mm of the tire.

3 Claims, 2 Drawing Sheets

PNEUMATIC TIRE FOR PASSENGER CARS HAVING SPECIFIED HARSHNESS FACTOR

The present invention relates to a pneumatic tire for passenger cars in which a novel harshness factor is specifically defined to reduce the so called harshness noise without deteriorating the steering stability.

BACKGROUND

When a passenger car runs on paved roads having joints, humps, hollows and the like, the shocks thereby are transmitted from the tires to the inside of the car through the suspension mechanisms and felt as sound as well as shocks. This sound is called 'harshness noise'.

The harshness noise can be reduced by using a relatively soft tread rubber for example. In this case however, the steering stability decreases.

It is therefore an object of the present invention to provide a pneumatic tire for passenger cars in which the harshness noise is reduced without deteriorating the steering stability.

BRIEF SUMMARY OF THE INVENTION

According to the present invention a pneumatic tire for passenger cars comprises a tread portion, and when the tire is mounted on a regular rim and inflated to 200 kPa and loaded with no tire load, the tread portion is provided with a profile comprising a crown part having a radius of curvature R1 in (mm) and shoulder parts each having a radius of curvature R2 in (mm), the crown part defined as extending from the tire equator to an axial position on each side thereof spaced at an axial distance of 35% of a tread width from the tire equator, the shoulder part defined as extending on one side of the tire equator from an axial position spaced at an axial distance of 37.5% of the tread width from the tire equator to an axial position spaced at an axial distance of 45% of the tread width from the tire equator, wherein a harshness factor HF is set in the range of from 3.2 to 3.5, the harshness factor HF defined as $$HF = -0.133 \times (R1/100) + 0.245 \times (R1/R2) - 0.183 \times (Kv/10) + 3.898$$

wherein
Kv is the vertical spring constant (KN/mm) of the tire.

The 'tread width TW' is the maximum axial width of the ground contacting area under a standard condition in which the tire is mounted on a regular rim and inflated to a standard pressure of 200 KPa and then loaded with a normal load W0. The 'regular rim' is the rim officially approved for the tire by standard organization, i.e. JATMA (Japan and Asia), T&RA (North America), ETRTO (Europe), STRO (Scandinavia) and the like. The normal load W0 is 75% of the maximum load specified by the same organization. Incidentally, the reason why 200 kPa is used is that this value is typical of almost all tire sizes as service pressure.

The inventors discovered that the harshness noise of passenger car tires can be reduced by optimizing the tread crown radius, tread shoulder radius and tire vertical spring constant, and that it is effective to limit the newly established harshness factor HF into a specific range. If the harshness factor HF is less than 3.2, the harshness noise can not decrease effectively. If the harshness factor HF is more than 3.5, the steering stability deteriorates.

An embodiment of the present invention will now be described in detail in conjunction with the accompanying drawings.

DETAILED DESCRIPTION OF THE INVENTION

Figure 1:
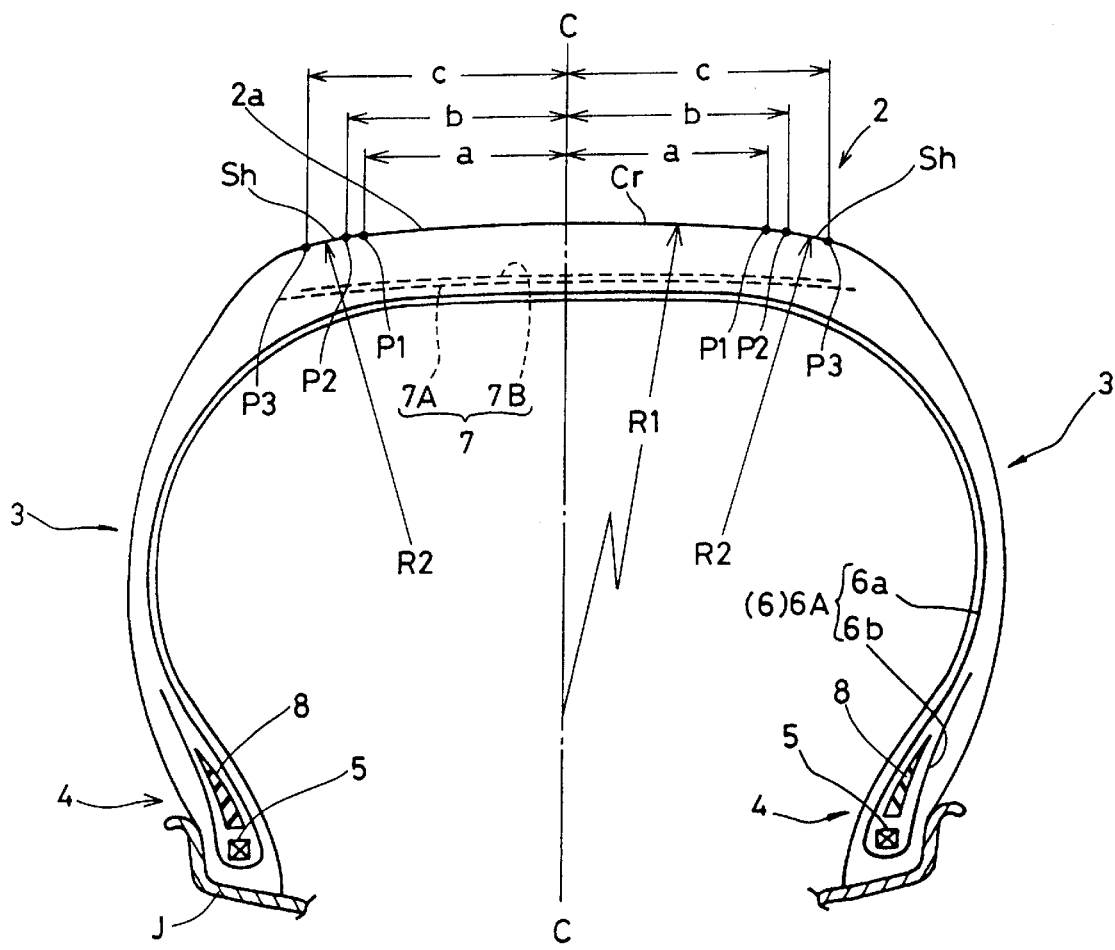
FIG. 1 is a cross sectional view of a pneumatic tire for passenger cars showing an embodiment of the present invention.

In FIG. 1, a passenger pneumatic tire according to the invention comprises a tread portion 2, a pair of bead portions 4 with a bead core 5 therein, a pair of sidewall portions 3, a carcass 6 extending between the bead portions, and a belt 7 disposed radially outside the carcass 6 in the tread portion.

The carcass 6 comprises at least one ply of cords arranged radially at an angle of from 75 to 90 degrees with respect to the tire equator C and extending between the bead portions 4 through the tread portion 2 and sidewall portions 3 and turned up around the bead cores 5 in the bead portions to form a pair of turnup portions 6b and a main portion 6a therebetween. In this embodiment, the carcass is composed of a single ply of cords arranged at substantially 90 degrees. Thus, the tire is a radial tire. For the carcass cords, organic fiber cords, e.g. polyester, nylon, rayon and aromatic polyamid and the like and steel cords can be used. In this embodiment, polyester cords are used. Between the main portion 6a and each turnup portion 6b, a bead apex 8 made of hard rubber extending radially outwardly from the bead core 5 is disposed.

The belt 7 comprises a breaker and optionally a band. The breaker is composed of at least two cross plies each made of parallel cords laid at an angle of from 15 to 40 degrees with respect to the tire equator. The band is composed of at least one cord ply of which cord angle is substantially zero with respect to the tire equator. In this embodiment, the belt is composed of two cross breaker plies, a radially inner ply 7A and a radially outer ply 7B slightly narrower than the inner ply 7A. For the belt cords, steel cords and high elastic modulus organic fiber cords, e.g. aramid, rayon and the like can be used. In this embodiment, steel cords are used.

Under a normally-inflated unloaded state in which the tire is mounted on a regular rim J and inflated to 200 kPa and loaded with no tire load, the tread portion 2 is provided with a profile 2a comprising a crown part Cr which is convex and has a radius of curvature R1 in (mm) and shoulder parts Sh each of which is convex and has a radius of curvature R2 in (mm). The crown part Cr is defined as extending from the tire equator C to an axial position P1 on each side thereof spaced at an axial distance (a) of 35% of the tread width TW from the tire equator C. The shoulder part Sh is defined as extending on one side of the tire equator from an axial position P2 spaced at an axial distance (b) of 37.5% of the tread width TW from the tire equator C to an axial position P3 spaced at an axial distance (c) of 45% oh the tread width TW from the tire equator C.

Preferably, the crown radius R1 is set in the range of from 2 to 10 times the tread width TW, and the shoulder radius R2 is set in the range of from 1 to 5 times the tread width TW. Usually, R1>R2, and each of the crown part and shoulder parts is a single radius curvature.

By using such crown radius R1 in (mm) and shoulder radius R2 in (mm) and a vertical spring constant Kv in (kN/mm) of the tire, a harshness factor HF is defined as $$HF = -0.133 \times (R1/100) + 0.245 \times (R1/R2) - 0.183 \times (Kv/10) + 3.898$$

Figure 2:
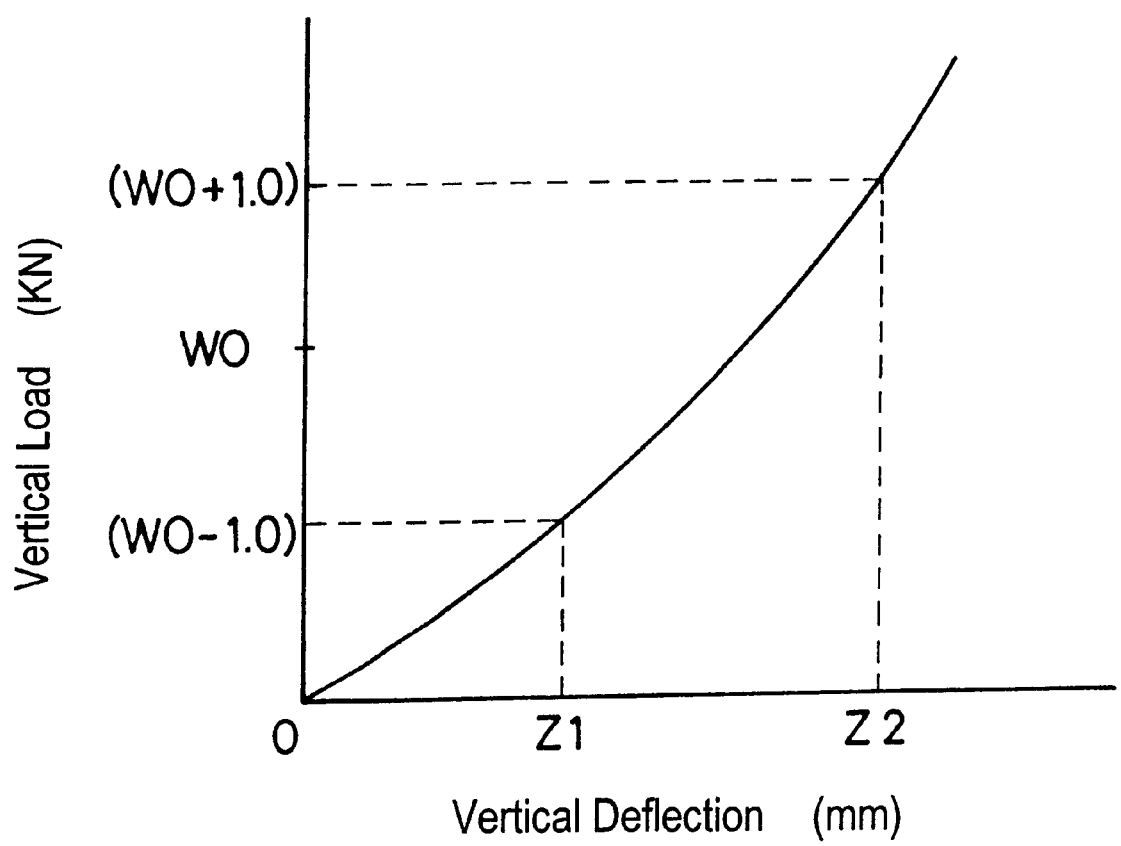
FIG. 2 is a graph showing a relationship between tire load and vertical deflection.

The vertical spring constant Kv is defined as $$Kv=2.0/(Z2-Z1)$$

wherein
the vertical deflections Z1 and Z2 (in mm) of the tire, which is mounted on the regular rim J and inflated to 200 kPa, are measured while the tire load is varied plus/minus 1.0 kN from a normal load W0 as shown in FIG. 2, and Z1 is the vertical deflection in mm under the minus 1 kN condition and Z2 is the vertical deflection in mm under the plus 1 kN condition.

If HF is less than 3.2, the harshness noise can not reduce effectively. If HF is more than 3.5, the steering stability deteriorates. In the present invention, therefore, the harshness factor HF is limited into a narrow range of 3.2 to 3.5.

Comparison Test

Test tires having the structure shown in FIG. 1 and specifications given in Table 1 were made by way of test and tested for the vertical spring constant, harshness noise, and steering stability.

A 2800 cc FR passenger car provided with test tires was run on a dry asphalt test course, and the harshness noise and steering stability were evaluated by the driver's feelings.

The results are indicated in Table 1 by an index based on Ref.2 being 100, wherein the larger the value, the better the performance (Harshness noise and Steering stability).

TABLE 1

| Tire | Ex. 1 | Ex. 2 | Ref. 1 | Ref. 2 | Ref. 3 |
|---|---|---|---|---|---|
| Crown radius R1(mm) | 483 | 400 | 981 | 757 | 319 |
| Shoulder radius R2(mm) | 315 | 225 | 396 | 366 | 162 |
| Vertical spring constant Kv(kN/mm) | 20.6 | 18 | 23.3 | 20.3 | 14.1 |
| Harshness factor HF | 3.3 | 3.5 | 2.8 | 3 | 3.6 |
| Harshness noise | 108 | 110 | 95 | 100 | 115 |
| Steering stability | 94 | 97 | 105 | 100 | 90 |

Tire size: 215/55R16
Rim size: 16X7JJ (regular rim)
Inner pressure: 200 KPa

From the test results, it was confirmed that Example tires according to the present invention can be improved in the harshness noise without deteriorating the steering stability.

What is claimed is:

1. A pneumatic tire for passenger cars comprising a tread portion,
   wherein when the tire is mounted on a regular rim and inflated to 200 kPa and loaded with no tire load, said tread portion is provided with a profile comprising a crown part having a radius of curvature R1 in mm and shoulder parts each having a radius of curvature R2 in mm,
   said crown part defined as extending from the tire equator to an axial position on each side thereof spaced at an axial distance of 35% of a tread width from the tire equator,
   each said shoulder part defined as extending on one side of the tire equator from an axial position spaced at an axial distance of 37.5% of the tread width from the tire equator to an axial position spaced at an axial distance of 45% of the tread width from the tire equator, the tire characterized in that
   a harshness factor HF is set in the range of from 3.2 to 3.5,
   said the harshness factor HF defined as $$HF=-0.133 \times (R1/100)+0.245 \times (R1/R2)-0.183 \times (Kv/10)+3.898$$

wherein
Kv is the vertical spring constant in kN/mm of the tire.

2. The pneumatic tire according to claim 1, wherein said crown radius R1 is in the range of from 2 to 10 times the tread width, and said shoulder radius R2 is smaller than the crown radius R1 and is in the range of from 1 to 5 times the tread width.

3. In a method of making a pneumatic tire for passenger cars with reduced harshness noise, the improvement comprising a step of limiting a harshness factor HF to a value in the range of from 3.2 to 3.5,
   said harshness factor HF being defined as $$HF=-0.133 \times (R1/100)+0.245 \times (R1/R2)-0.183 \times (Kv/10)+3.898$$

wherein when the tire is mounted on a regular rim and inflated to 200 kPa and loaded with no tire load,
R1 is the radius in mm of curvature of a tread crown part, R2 is the radius in mm of curvature of tread shoulder parts, Kv is the vertical spring constant in kN/mm of the tire, said tread crown part being defined as extending from the tire equator to an axial position on each side thereof spaced at an axial distance of 35% of a tread width from the tire equator, and each said tread shoulder part being defined as extending on one side of the tire equator from an axial position spaced at an axial distance of 37.5% of the tread width from the tire equator to an axial position spaced at an axial distance of 45% of the tread width from the tire equator.

* * * * *